R. JONES.
PLOW FENDER.
APPLICATION FILED JAN. 17, 1910.
963,295.
Patented July 5, 1910.
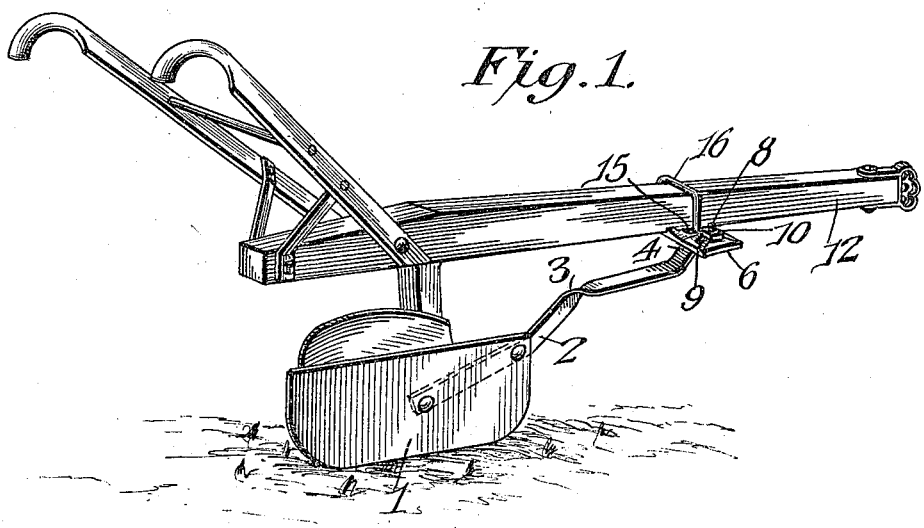
Fig. 1.
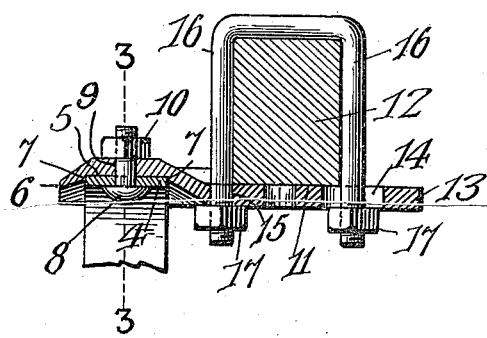
Fig. 2.
Fig. 3.
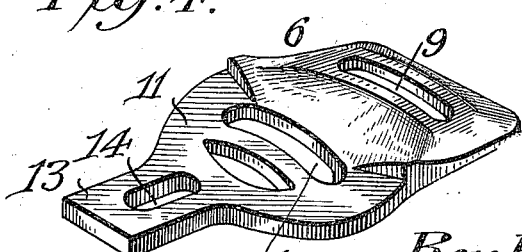
Fig. 4.
Fig. 5.
Witnesses
Reuben Jones, Inventor
By
Attorney

UNITED STATES PATENT OFFICE.

REUBEN JONES, OF CHAMBLEE, GEORGIA.

PLOW-FENDER.

963,295.  Specification of Letters Patent.  Patented July 5, 1910.

Application filed January 17, 1910. Serial No. 538,489.

*To all whom it may concern:*

Be it known that I, REUBEN JONES, a citizen of the United States, residing at Chamblee, in the county of Dekalb and State of Georgia, have invented a new and useful Plow-Fender, of which the following is a specification.

The invention relates to improvements in plow fenders.

The object of the present invention is to improve the construction of plow fenders, more especially the means for attaching the same to the beam of a plow, and to provide a simple, strong and durable device of inexpensive construction, and capable of adjustment longitudinally and laterally with relation to the plow beam, and adapted also to be easily raised or lowered, whereby the fender may be arranged in the desired position to permit a proper amount of soil to pass beneath it to the plants under cultivation, and at the same time afford the necessary protection to the plants to prevent them from being covered or injured.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a fender, constructed in accordance with this invention and shown applied to a plow. Fig. 2 is a transverse sectional view, the section being taken centrally of the attaching means. Fig. 3 is a vertical sectional view on the line 3—3 of Fig. 2. Fig. 4 is a detail perspective view of the attaching plate or member. Fig. 5 is a reverse plan view of the same.

Like numerals of reference designate corresponding parts in all the figures of the drawing.

1 designates a plow fender designed to be arranged at one side of a plow, as illustrated in Fig. 1, and provided with an upwardly extending resilient arm or bar 2, provided intermediate of its ends with a quarter bend 3 and having the side faces of its rear portion arranged in substantially a vertical plane while the side faces of its front portion are arranged substantially in a horizontal position. This provides a double spring action and permits the fender to spring upwardly and downwardly as well as laterally. The rear portion of the arm is secured by rivets, or other suitable fastening devices to the fender, and its front end portion 4 is curved longitudinally and is arranged in a curved bearing groove 5 of the outer portion of an attaching plate or member 6. The outer portion of the attaching plate or member is arched, and the bearing groove 5, which extends from the front to the rear edge of the attaching plate, has substantially vertical side walls 7, engaging the side edges of the curved terminal portion 4 of the arm 2, and adapted to hold the same against lateral movement, whereby a single fastening device, such as a bolt 8 may be employed for rigidly securing the front end of the arm to the attaching plate. The arched outer portion of the attaching plate is provided with a slot 9, extending along the bearing groove at the center thereof and adapted to permit an arcuate adjustment of the front end of the arm 2, whereby the fender may be raised or lowered. The head of the bolt is arranged at the lower face of the curved terminal portion 4, and the nut 10 engages the upper face of the outer portion of the attaching plate 6.

The attaching plate 6 has a flat inner portion 11, which is adapted to extend beneath a plow beam 12 in a direction transversely thereof, as clearly shown in Figs. 1 and 2 of the drawing. The inner flat portion 11 is preferably reduced and tapered, as shown, and it is provided at the reduced end 13 with a slot 14, extending along the reduced portion and arranged transversely of the plow beam. The inner flat portion 11 is provided adjacent to the arched outer portion with an arcuate slot 15, the slots 14 and 15 being spaced apart and adapted to be arranged at opposite sides of the plow beam to receive the side portions of a clip 16, extending through the slots 14 and 15 and provided at the lower face of the attaching plate with nuts 17. The slot 14 enables different sizes of clips to be used for securing the attaching plate to plow beams of different thicknesses, and the arcuate slot 15 permits a horizontal pivotal adjustment of the fender to arrange the same the desired distance from the plow-share. The clip permits the plate to be adjusted longitudinally. The several adjustments of the fender will enable the latter to be arranged in the desired position to afford the necessary protection to the plants being cultivated, and also to permit the desired quantity of soil to pass beneath it to the plants.

Having thus fully described my invention, what I claim as new and desire to secure by Letters Patent, is:—

1. The combination of a fender provided with an arm having a curved terminal portion arranged in substantially a horizontal position, an attaching member provided with a curved bearing portion also arranged horizontally and receiving the curved portion of the arm and permitting an arcuate adjustment thereof to raise and lower the fender, and means for securing the arm in its adjustment.

2. The combination of a fender provided with an arm having a curved terminal portion arranged in substantially a horizontal position, an attaching member having a horizontal outer portion provided with a curved bearing receiving the curved portion of the arm and permitting an arcuate adjustment of the same to raise and lower the fender, said member being also provided with an inner attaching portion, means for securing the arm in its adjustment, and means for securing the attaching portion of the member to a plow beam.

3. The combination of a fender provided with an arm having a curved terminal portion, an attaching member provided at its outer portion with a curved bearing receiving the curved portion of the arm and permitting an arcuate adjustment of the same to raise and lower the fender, said member being also provided with an inner attaching portion having spaced slots, one of the slots being curved, means for securing the fender in its adjustment, and fastening means passing through the said slots for securing the attaching member to a plow beam, the curved slot permitting a pivotal adjustment of the attaching member.

4. The combination of a fender provided with an arm having a curved terminal portion, an attaching member provided at its outer portion with a curved bearing receiving the curved portion of the arm and permitting an arcuate adjustment of the same to raise and lower the fender, said member being also provided with an inner attaching portion having spaced slots, one of the slots being curved and the other slot being elongated, means for securing the arm in its adjustment, and fastening means arranged in the said slots for securing the member to a plow beam, the curved slot permitting a pivotal adjustment of the attaching member and the elongated slot permitting the fastening means to be arranged different distances apart to accommodate plow beams of different widths.

5. The combination of a fender provided with an arm having a curved terminal portion, an attaching member provided in its lower face with a bearing groove presenting a curved bearing face to the curved portion of the arm and provided with side shoulders, and a fastening device extending through the attaching member and the arm and securing the parts together.

6. The combination of a fender provided with an arm having a curved terminal portion, an attaching member provided in its lower face with a bearing groove presenting a curved face to the curved portion of the arm, said member being also provided with a slot extending along the bearing groove, and a fastening device operating in the slot and adjustably securing the arm to the attaching member.

7. The combination of a fender provided with an arm having a curved terminal portion, an attaching member having an inner attaching portion and provided with an outer arched portion forming a lower curved bearing groove having side walls, said arched portion being also provided with a slot extending along the bearing groove, and a fastening device operating in the slot and adjustably securing the curved portion of the arm in the bearing groove.

In testimony, that I claim the foregoing as my own, I have hereto affixed my signature in the presence of two witnesses.

REUBEN JONES.

Witnesses:
JAMES H. PADGETT,
GEO. F. CURRY, Jr.